United States Patent [19]

Haylett

[11] Patent Number: 4,470,120
[45] Date of Patent: Sep. 4, 1984

[54] DEMODULATION TECHNIQUE FOR RIP DETECTOR SIGNALS

[75] Inventor: Lyle M. Haylett, Mantua, Ohio

[73] Assignee: The B.F. Goodrich Company, Akron, Ohio

[21] Appl. No.: 288,883

[22] Filed: Jul. 31, 1981

[51] Int. Cl.³ .................... G06F 15/46; G08B 21/00
[52] U.S. Cl. .................... 364/507; 364/551; 198/856
[58] Field of Search ............ 364/507, 551, 550, 468, 364/484, 487, 719; 328/155; 198/856, 502; 329/122, 137

[56] References Cited

U.S. PATENT DOCUMENTS

| | | | |
|---|---|---|---|
| 3,792,459 | 2/1974 | Snyder | 198/856 X |
| 3,835,397 | 9/1974 | D'Antonio | 328/155 |
| 3,889,186 | 6/1975 | Larson | 328/155 X |
| 3,997,772 | 12/1976 | Crochiere et al. | 328/155 X |
| 4,035,735 | 7/1977 | Akashi et al. | 328/155 X |
| 4,180,778 | 12/1979 | Worthington | 328/155 |
| 4,228,513 | 10/1980 | Doljack | 364/468 X |
| 4,246,654 | 1/1981 | Maim | 364/484 X |
| 4,345,211 | 8/1982 | Longworth | 328/155 X |
| 4,349,883 | 9/1982 | Doljack | 198/856 X |

Primary Examiner—Edward J. Wise
Attorney, Agent, or Firm—Maky, Renner, Otto & Boisselle

[57] ABSTRACT

Synchronous demodulation using a lock in amplifier technique improves substantially the signal to noise ratio in a conveyor belt rip detector. The lock in amplifier technique uses an analog multiplier to form a product of a received AC transmitter signal, i.e. that received by the rip detector receiver from an antenna carried by the conveyor belt, and an AC reference signal, which has the same frequency as the transmitted AC transmitter signal, i.e. that transmitted by the rip detector transmitter. A shift in the phase of the AC transmitter signal as it is coupled from the transmitter to the receiver requires a corresponding shift in the phase of the AC reference signal so that the latter is tuned to the same phase as that of the received AC transmitter signal.

The invention lends itself to computer control and self diagnosis of faults of the overall rip detector system. To effect such fault detection not only is there produced an AC transmitter signal and an AC reference signal, but there also is produced a test signal representative of proper operation of the transmitter, and this parameter is checked to learn whether a rip has occurred causing an antenna not to be sensed at an expected location on the belt or a fault has occurred in the rip detector equipment.

58 Claims, 6 Drawing Figures

DEMODULATION TECHNIQUE FOR RIP DETECTOR SIGNALS

TECHNICAL FIELD

The present invention relates to rip detectors and, more particularly, to use of an improved demodulation technique for improving recognition of capacitively coupled signals at a rip detector station.

BACKGROUND

In large endlless non-metallic conveyor belts, which may have metal reinforcing cables therein, used to convey bulk material, there is a possibility of encountering a rip in the belt, for example, by a sharp object dropped thereon at the loading station. It is desirable promptly to detect such rips and, preferably, to shut down the conveyor belt upon such detection, thereby minimizing damage to the belt. One such conveyor belt rip detector is disclosed in U.S. Pat. No. 3,792,459. In such rip detector plural antennas, which may be single electrical conductors, are embedded in the belt transversely to its length at spaced-apart locations in the belt. An electrical signal is coupled by respective antennas from a transmitter to a receiver as the belt moves and the respective antennas pass in capacitive coupling relation with the transmitter and receiver at a rip detector station, and the receiver thus delivers an input signal to detector circuitry which interprets the same as an indication of satisfactory belt integrity. However, a broken antenna, for example at a place where the belt has been ripped, will not couple the transmitter signal through to the receiver, and the detector then senses the same as an indication of the occurrence of a rip condition. The detector circuit in such patent is operative after the lapse of a predetermined time period corresponding to the passage of a given number of broken antennas past the rip detector station to produce a distinguishable output that activates an alarm and/or deactivates the conveyor belt drive.

A number of improvements for use in conveyor belt rip detectors are disclosed in U.S. Pat. No. 4,228,513. One of such improvements includes a means for detecting the progress of the conveyor belt to know when an antenna should be at the rip detector station. If there is no antenna present then, a prompt shutdown of the conveyor belt drive may be effected.

Wear, stretching, contraction, dirt, other environmental conditions, etc. may cause a variation in the efficiency of signal coupling, whether of the capacitive, inductive, optical, or any other type of coupling, between the antennas (or other signal coupling means carried by the belt) and the transmitter and the receiver at a rip detector station. Such efficiency variation will vary the magnitude or other parameter of the input signal delivered from the receiver to the detector, which may detrimentally affect operation of the entire system.

Thus, it would be desireable to provide signal information to the detector at a relatively accurately controlled magnitude (or other parameter). In copending, commonly assigned U.S. patent application Ser. No. 126,218, filed Mar. 3, 1980, now U.S. Pat. No. 4,349,883, issued Sept. 14, 1982, such magnitude control is effected digitally, step-wise and efficiently. An improved antenna detection technique and provisions to avoid nuisance shut downs of the conveyor belt also is disclosed in commonly assigned U.S. Patent application Ser. No. 133,595, filed Mar. 24, 1980, for "Method And Apparatuss For Updating Event Information".

It has been discoverd, as has been described in commonly assigned copending U.S. patent applicaton Ser. No. 275,969, filed June 22, 1981, for "Signal to Noise Ration Improvement for Rip Detectors" that in some operational environments of conveyor belt rip detectors the electrical noise is so great that the poor signal to noise ratio significantly decreases the accuracy of the rip detector function. Moreover, and very importantly, it has been discovered that in a conveyor belt that carries antennas intended for capacitive coupling with the transmitter and receiver at a rip detector station, much of the electrical noise introduced to the receiver is derived from cross coupling, primarily of a capacitive nature, between the capacitive probes of the transmitter and receiver via the belt itself and/or apparatus associated therewith, such as the rollers, drive wheels, support frame, etc. In connection with such discovery, an equivalent electric circuit model of the transmitter/belt/receiver connection has been developed and used to determine an efficient technique for improving signal to noise ratio even in extremely electrically noisy environments. In accordance with the invention of such application, and in opposite contrast to what ordinarily would be expected, the signal to noise ratio is improved by reducing the frequency of the AC signal ordinarily used in a rip detector system in which the transmitter and receiver are capacitively coupled to antennas sequentially carried past the rip detector station by a conveyor belt. The equivalent circuit model has been found to include between the two input and output probe capacitors a finite resistance of the antenna itself and a cross coupling capacitance operating in parallel with such antenna resistance.

In each of the above patents and applications diode detectors are used in the receiver to convert the modulated AC transmitter signal to DC pulses representing passage of integral antennas past the rip detector station. Such diode detectors, even with associated conventional filters, may be unsatisfactory to distinguish the antenna pulses from the noise in particularly electrically noisy environments.

The entire disclosures of the above and below mentioned patents and applications hereby are incorprated by reference.

We have found that the magnitude of the electrical noise signal in a conveyor belt rip detector often approaches the magnitude of the transmitter signal; and, therefore, it is quite difficult to sense a received transmitter signal with accuracy, especially in particularly electrically noisy environments in which conveyor belt rip detectors often are found.

The electrical noise problem becomes all the more acute in rip detector systems because there usually must be at least one or two signal couplings by non-contacting means, for example, capacitive or inductive coupling. (The invention will be described in detail below with respect to use of a capacitive coupling technique, vis-a-vis the coupling of the AC transmitter signal to an antenna carried by a conveyor belt and coupling of the transmitter signal from the antenna to the receiver. However, it is believed that the features of the invention may be used when other types of rip detector signal couplings are employed, such as the noted inductive coupling.)

In the typical prior rip detector, the periodic coupling and non-coupling of an AC carrier signal (the AC transmitter signal), is a function of whether or not an antenna is present at the rip detector station; and such periodic coupling may be considered modulation of the transmitter AC carrier signal. The poor signal to noise ratio often occurring, however, may make it difficult to discern whether or not a rip has occurred, and this, of course, would reduce the effectiveness of the rip detector.

One technique used for noise filtering or signal to noise ratio improvement is known as the lock in amplifier, a disclosure of which is presented in "Optimization of Electronic Measurements" by Howard Malmstadt, et al. (W. A. Benjamin Publishers, Menlo Park, Calif.), at pages 118–125. Prior use of lock in amplifiers, however, has been generally restricted to laboratory environments, such as with the spectrophotometric measuring equipment in the Malmstadt publication. Moreover, to use effectively a lock in amplifier, it is necessary that a modulated AC carrier signal and a reference AC signal be substantially in phase with each other to achieve desired synchronous demodulation. Therefore, as is described by Malstadt, phase adjustment may be provided for the reference AC signal.

SUMMARY OF THE INVENTION

We have discovered that in a conveyor belt rip detector in which the above-noted capacitive coupling technique is used, there is an unexpected phase shift in the signal coupled from the transmitter to the receiver via the antennas as they pass or are located at the rip detector station of the transmitter and receiver. That phase shift may be as much as 180°, and possibly even greater, and the phase shift may vary from one conveyer apparatus to the next and even may vary over time on a single conveyor apparatus. We have developed a number of improvements for use in conveyor belt rip detectors that enable computer or computer type monitoring and control by a rip detector with improved accuracy over prior rip detectors by employing a synchronous demodulation, and, more specifically, a modified lock in amplifier technique. The invention also facilitates computer controlled fault self-diagnosis by having the transmitter output not only an AC transmitter signall and an AC reference signal, but also a test signal representative of transmitter operation.

Synchronous demodulation of the received AC transmitter signal, i.e. as it is received by the rip detector receiver, is achieved by a lock in amplifier technique, which uses an analog multiplier to form a product of the received AC transmitter signal and an AC rreference signal. The AC reference signal is of the same frequency as the AC transmitter signal. However, there is a phase shift in the AC transmitter signal as it is coupled from the transmitter to the receiver. The underlying reason for such phase shift is not fully understood; however, it is our belief that such phase shift is due at least in part to the cross coupling effected by the conveyor belt apparatus itself as well as by the capacitive connections effected among the transmitter, antenna and receiver. Such cross coupling is described above in the last mentioned copending application.

The phase of the AC reference signal, then, in the present invention, is shifted from that of the transmitted AC transmitter signal, i.e. as the AC transmitter signal is produced by the transmitter, and is tuned to the same phase as that of the received AC transmitter signal.

Coupled downstream of the analog multiplier in the invention is an integrator or other apparatus for low pass filtering the output from the multiplier. The combination of the analog multiplier and low pass filter results in an output from the latter which is at a relatively constant DC level, which can be conveiently zeroed, when no antenna is present at a rip detector station. A DC pulse is produced at the output of the integrator, though, whenever an integral antenna passes the rip detector station.

In accordance with one aspect of the invention, then, a conveyor belt rip detector apparatus for sensing antennas carried by a conveyor belt as a representation of belt integrity, includes a transmitter for transmitting a transmitter signal, and a receiver for receiving the transmitter signal coupled thereto by respective antennas, the receiver itself including lock in amplifier means for synchronously demodulating to filter the transmitter signal coupled by the antennas to the receiver.

According to another aspect of the invention, in a conveyor belt rip detector system in which antennas representative of belt integrity are sequentially carried past a rip detector station, including a transmitter for transmitting an AC transmitter signal and a receiver for receiving such AC transmitter signal coupled thereto by respective antennas, there is provided an improvement in the combination therewith of a lock in amplifier for filtering the AC transmitter signal thereby to improve discerning thereof from electrical noise, and, therefore, effectively improving the signal to noise ratio of the AC transmitter signal.

According to an additional aspect of the invention, an apparatus for monitoring the integrity of a conveyor belt carrying antennas representative of belt integrity includes a signal generator for generating a transmitter signal for transmission to such antennas and a referenced signal, such signals having a selected phase relationship, a receiver for receiving such transmitter signals coupled thereto by such antennas, and the receiver itself including an analog multiplier for obtaining a product of the transmitter signal received from the antennas and the reference signal. Moreover, there preferably is provided a means for selecting the phase relationship between the transmitter signal and the reference signal to optimize synchronous demodulation carried by the analog multiplier.

According to a further aspect of the invention, there is provided in a method of improving signal recognition in a conveyor belt rip detector in which antennas representative of integrity of and carried by the conveyor belt sequentially passed a rip detector station couple a transmitter signal between a transmitter and a receiver and, therefore, modulate the transmitter signal, an improvement which comprises demodulating the transmitter signal using a reference signal having substantially the same frequency as the transmitter signal.

According to yet another aspect of the invention, a method of monitoring the integrity of a conveyor belt carrying antennas representative of conveyor belt integrity comprises producing an AC transmitter signal, producing an AC reference signal, modulating the AC transmitter signal by sequentially coupling and not coupling such AC transmitter signal with respect to a receiver as such antennas are carried sequentially passed a rip detector station, coupling the AC reference signal to such receiver, demodulating such AC transmitter signal coupled to such receiver by such reference signal, and tuning the phase relation between such AC transmitter signal and such AC reference signal to optimize said demodulating.

With the foregoing in mind, a primary object of the invention is to improve conveyor belt rip detector apparatus and method, as is noted herein.

Another object is to improve the accuracy of conveyor belt rip detectors.

An additional object is to facilitate separating electrical signals from electrical noise in a conveyor belt rip detector apparatus.

A further object is to enhance overall operation of conveyor belt rip detectors.

Still another object is to cancel the effect of noise in a conveyor belt rip detector circuit apparatus.

Still an additional object is to improve the ability to detect a particular signal produced in a conveyor belt rip detector as a representation of the integrity of the conveyor belt.

Still a further object is to improve the effectiveness, operation and diversity of conveyor belt rip detectors.

Even another object is to improve the ability of conveyor belt rip detectors to operate in relatively electrically noisy environments.

Even an additional object is to increase the sharpness of a periodic signal to distinguish the same from electrical noise.

Even a further object is to eliminate random noise signals while demodulating a periodic electrical signal in a conveyor belt rip detector apparatus.

Yet a further object is to block cross coupled noise occurring in a conveyor belt rip detector apparatus from significantly interfering with signals representative of conveyor belt integrity.

These and other objects and advantages of the present invention will become more apparent from the following description.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 3A is a graphical presentation of a waveform of a signal occurring in the circuit of FIG. 3;

FIG. 4 is a schematic electric circuit diagram of a signal output and switching circuit of the invention.

DETAILED DESCRIPTION OF INVENTION

Figure 1:
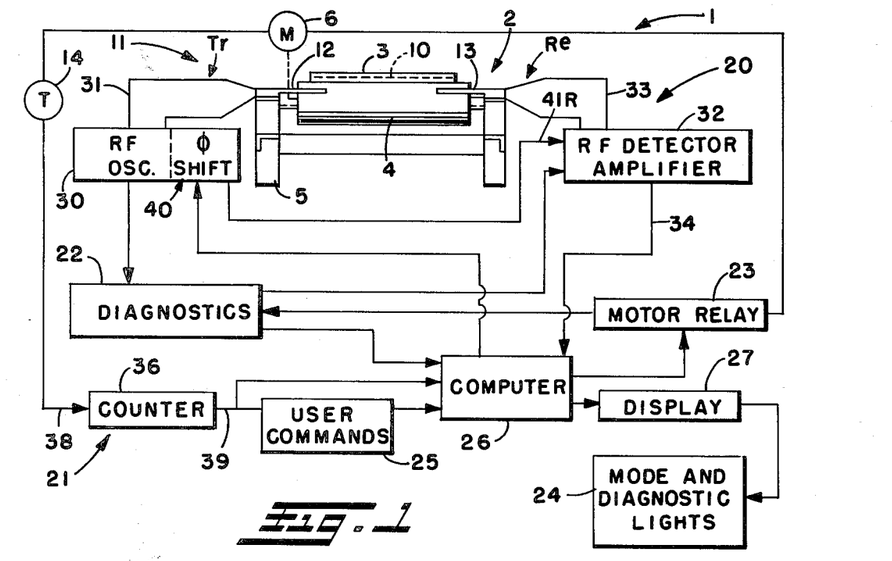
FIG. 1 is a schematic system diagram of a conveyor belt system with which the conveyor belt rip detector monitor system of the present invention may be used.
Figure 2:
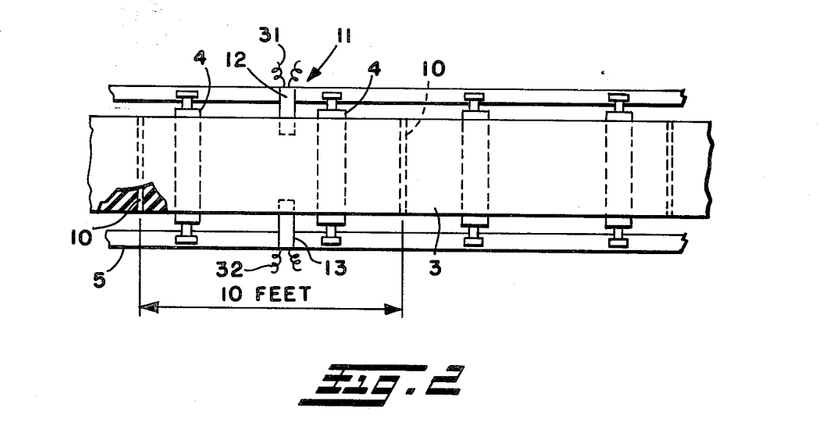
FIG. 2 is a fragmentary top plan view schematically showing the conveyor belt, antennas therein, and a rip detector station.

Referring to FIGS. 1 and 2, a monitor system generally indicated at 1 is shown in association with a conveyor belt system 2 for detecting a rip, tear, or other similar flaw (hereinafter collectively "rip") in the conveyor belt 3. The belt 3, which may be a conventional endless, non-metallic conveyor belt, is supported by rollers 4 at longitudinal stations along a support frame 5 and is driven by a motor 6 which turns a drive roller.

The transducer technique for observing the structural integrity, or lack of the same, e.g. a rip, of the belt 3 uses a plurality of antennas 10 embedded in or otherwise carried by the belt generally transversely to the travel direction thereof and at a rip detector staion 11 a transmitter plate 12 of a transmitter Tr and a receiver plate 13 of a receiver Re. Each antenna 10 may be a single electrical conductor of relatively small gauge, or other type of electrical conductor, such as a wire, a conductive fabric, or reinforced tire cord, which is most preferred, intended, when passing the station 11, capacitively to couple with the transmitter and receiver plates 12, 13 to couple an electrical signal therebetween. Such signal coupling indicates the structural integrity of the antenna and proximate portions of the belt 3; the lack of such signal coupling where it is expected to occur generally indicates a flaw, such as a break in the antenna and a rip in the proximate portion of the belt 3.

As the belt 3 progresses in its process of traveling along its length, the monitor system 1 continuously looks for the sequential cyclical occurrence of events, namely the passing of the respective antennas by the rip detector station 11. The monitor system 1 also particularly observes the progress of such process by monitoring the rotation of the motor 6 or drive roller with a conventional tachometer 14, and correlates such progress information with the detected event information to sense promptly when an event has been missed. Upon missing one or more events, the monitor system 1 may promptly stop the motor 6 to shut down the conveyor belt system 2 minimizing any rip damage to the belt 3.

The fundamental components of the monitor system 1 include an event detector 20, a progress detector 21, a diagnostics portion 22, a shut-down control portion 23, an output indicator portion 24, a user command portion 25, a comparator portion 26, such as a computer, and preferably a microcomputer, that stores and compares information received from the various portions of the monitor system and effects appropriate control in response to such information, and a display portion 27.

The event detector 20 is coupled to an event transducer including the transmitter and receiver plates 12, 13 for capacitive coupling to and through an antenna 10. The detector 20 includes an oscillator 30, which produces an AC electrical signal, preferably in the radio frequency range, for example, on the order of about 25 KHz. to less than about 200 KHz., delivered by an electrical connection 31 to the transmitter plate 12 (this is the transmitted transmitter or antenna signal A); and a detector amplifier 32 coupled to the receiver plate 13. The transmitter Tr includes the plate 12 and oscillator 30, and the receiver Re includes the plate 13 and detector amplifier 32. When an antenna 10 passes in proximity to the transmitter plate 12 such AC signal is capacitively coupled to the antenna and from the antenna to the receiver plate 13 (this is the received transmitter or antenna signal A') for delivery via an electrical connection 33 as an event signal to the detector-amplifier 32. The detector-amplifier 32 preferably is primarily responsive only to an event signal that has a frequency at least approximately equal to the AC signal produced by the oscillator 30; accordingly, the detector-amplifier 32 preferably is a radio frequency responsive device. Receipt of a proper event signal is communicated as an event detect signal by a connection 34 to the computer in the comparator portion 26.

Progress of the belt movement is detected by the progress detector 21, which includes the progress transducer tachometer 14 and a counter 36. The tachometer 14 produces in conventional manner a series or train of electrical pulses on line 38. The frequency of such pulse train preferably is directed proportional to the rotational speed of the motor 6 and, accordingly, directly proportionately represents the progress of the belt 3 as it is driven along its path. The counter 36 converts the serial pulse train information from the tachometer 14 to parallel binary data, such as a 16 bit binary number, the progress signal, which also directly represents progress of the belt 3 and is delivered on a bus 39 to the computer in comparator portion 26.

Briefly, in operation of the monitor system 1 observing the belt 3 to sense whether a rip has occurred, information concerning the relative interval distances between each pair of adjacent antennas is obtained and stored during one cycle of the belt 3. Using such information, the monitor system sequentially looks for each antenna at its expected position, within a tolerable window of error or offset. The relevant interval distance information is updated each time an antenna is detected. However, when an antenna is missed, i.e. it is not sensed at its expected position, the monitor system 1 stops the belt 3.

More particularly, the computer 26, when it receives an event detect signal on line 34, reads and stores the progress signal received on bus 39. When the next event detect signal is received, the computer 26 again reads and stores the progress signal received on the bus 39. The value of the difference between the two progress signals, then, represents the distance between the two adjacent antennas 10 that passed the rip detector station 11 to produce the two event detect signals. This procedure is repeated to obtain information concerning the distances between each pair of adjacent antennas. Such information is measured or detected and is stored, for example in a table, during a programming mode of operation of the monitor system 1. After the table has been completed with information concerning the distances between every pair of adjacent antennas, the monitor system 1 can operate a rip detect mode. In the rip detect mode the computer 26 compares the progress signal received on bus 39 with the relevant value of information from the stored table to determine when an antenna 10 should be present at the rip detector station 11. If there is a whole antenna properly positioned at the rip detector station 11 in capacitive coupling relation with the transmitter and receiver plates 12, 13 at that time, meaning that the conveyor belt 3 also is whole, then the monitor system begins looking for the next antenna. However, if, when expected, there is no antenna present at the rip detector station 11 or the antenna then present is broken, indicating a conveyor belt system 2 fault or a belt rip, respectively, no event detect signal will be delivered to the computer 26; accordingly, the computer 26 promptly declares the event missing and may operate the start stop control portion 23 to stop the belt 3 in order to minimize any damage thereto.

Preferably the start stop control portion 23 is a relay that controls energization and de-energization of the motor 6 and/or a conventional clutch and braking system for the conveyor belt system 2. In the output indicator portion 24 plural mode lights and diagnostic lights, which are operated by the computer 26, indicate the operational mode of the monitor system 1 and the reason for any detected failure or shut-down of the conveyor belt system 2. The user command portion 25 may include a plurality of manually operated pushbutton controls or connections to receive electrical input control information from external equipment, such as a remote control panel, electronic control equipment, etc., to effect operational control of the monitor system.

Figures 2A, 3:
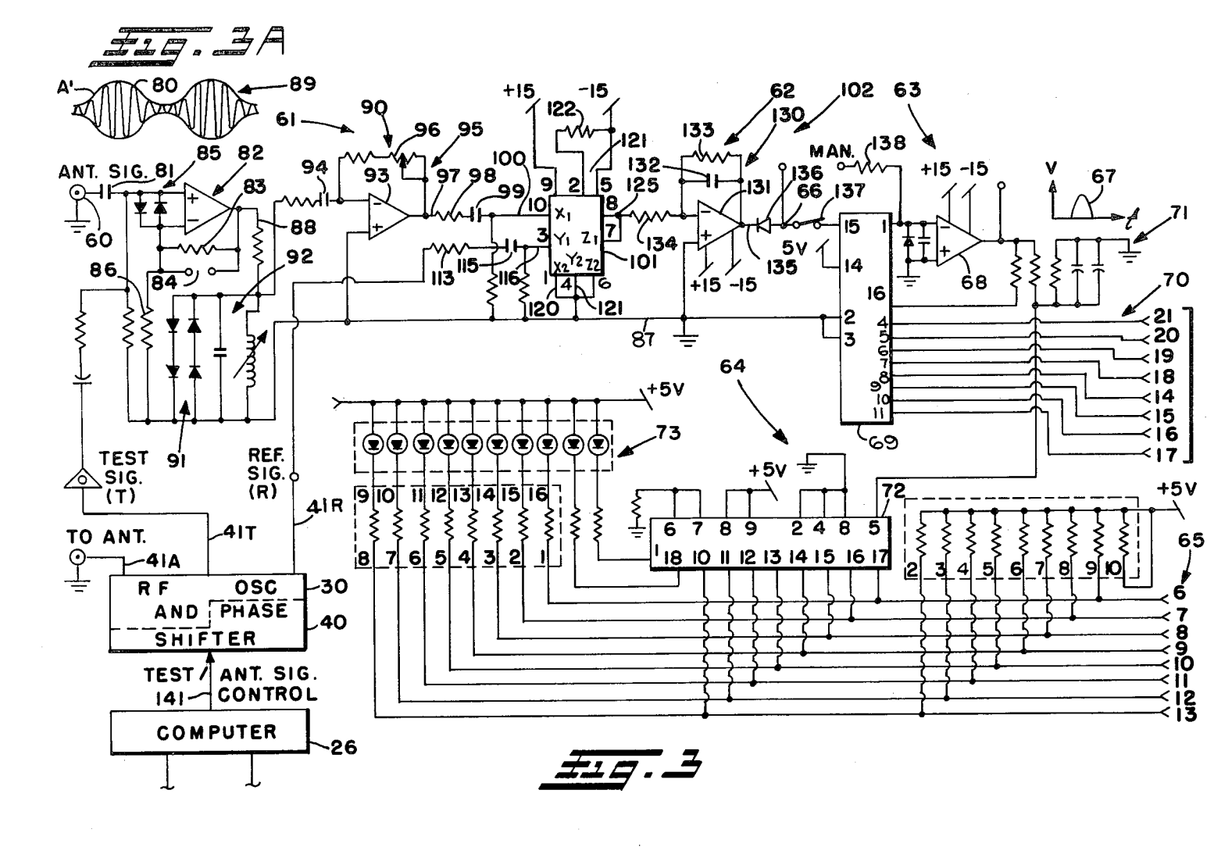
FIG. 3 is a schematic electric circuit diagram of a signal control circuit aparatus using the lock in amplifier of the invention.

Turning to FIG. 3, now, the RF oscillator 30 has associated with it a phase shifter 40 of conventional or other design, such as one shown in concurrently filed, commonly assigned U.S. patent application Ser. No. 288,882, for "Digital Phase Shift Circuit Signal Generator for Rip Detectors", which is controlled by the computer 26, to produce on lines 41A, 41T, and 41R AC signals having the same frequency but, perhaps, different phases, and those signals are identified, respectively, as an antenna signal A, a test signal T, and a reference signal R. Ordinarily, the reference and test signals are in phase, and the antenna signal is shifted in phase therefrom by an amount selected by the operator of the system 1.

The antenna signal A on line 41A is coupled to the transmitter plate 12. When an integral antenna is aligned at the rip detector station 11, it will couple the antenna signal to the receiver plate 13, which, in turn, is coupled by an input terminal 60 to a signal control circuit apparatus 61 of the detector amplifier 32. The antenna signal received at the input terminal 60 is pulse modulated increasing and decreasing in magnitude as an antenna approaches and leaves the detector station 11. Preferably no signal at the antenna signal frequency will be received by the receiver plate 13 when no antenna is proximate the same. However, it is possible, and in many cases quite likely, that electrical noise will be received at the receiver plate 13 and at terminal 60, whether or not any antenna is present at the rip detector station 11.

Moreover, and very importantly, as has been noted above, the phase of the received antenna signal A' received at the receiver plate 13 has been found to be shifted from the phase of the transmitted antenna signal A actually produced on line 41A; and it is the recognition of that phenomenon which enables operation of the present invention.

The signal control circuit apparatus 61 includes a demodulator circuit 62, which receives the event or antenna signal A' information from the input terminal 60 and demodulates the same with respect to the reference signal received on line 41R to eliminate noise effect, and, particularly, to distinguish an antenna signal A' when it occurs at the input terminal 60; a changing means 63, which receives an input signal and produces an output signal at a predetermined magnitude in response to receipt of such input signal; and a control means 64 for controlling the changing means proportionally stepwise in response to the magnitude of at least one of the input and output signals.

The apparatus 61 also includes an output bus 65, which corresponds to the connection 34 of FIG. 1, to couple the output signal to the computer 26 for the above described purposes. The changing means 63, control means 64, and bus 65 are described in detail in copending, commonly assigned U.S. patent application here in Ser. No. 126,218, filed Mar. 3, 1980, now U.S.

Pat. No. 4,349,883, issued Sept. 14, 1982. The portions 63-65 of the circuit apparatus 61 produce on the bus 65 parallel digital data representing the magnitude of a DC signal occurring at junction 66 at the output of the demodulator circuit 62. It is intended that the signal at junction 66 be a DC pulse-like signal, such as one of the waveform type shown at 67 at the output of an amplifier 68 each time an integral antenna passes the rip detector station 11. The circuit portions 63-65 respond to pulse signal at junction 66 to produce ordinarily a digital representation thereof on the bus 65. To effect such operation, the changing means 63 includes the amplifier 68 and a resistance ladder network 69, which is controlled digitally by information received on a control bus 70 from the computer 26. A filter 71 filters the output from the amplifier 68, and analog to digital converter 72 converts the output from the filter and the amplifier to the digital information for application to the bus 65. Moreover, a display 73, that includes a plurality of light immitting diodes is operative to display functioning of the A/D converter 72 and the actual magnitude of the digital data produced on the bus 65.

In the preferred embodiment and best mode of the invention, the antenna, test and reference signals A, T and R have a frequency of 62.5 KHz. Such frequency is not an even number to avoid interference from other transmitters. The received antenna signal A' at input terminal 60, then, in effect is a carrier wave modulated by the presence or not of an integral antenna at the rip detector station 11. Thus, the magnitude of the signal A' will be approximately 0 when no antenna is present and will grow to a fairly large magnitude represented at 80 in FIG. 3 as an antenna passes through the rip detector station.

The modulated antenna signal A' received at input terminal 60 passes through an input capacitor 81 to a first amplifier stage 82 of relatively high gain. Such amplifier stage has a feedback resistor 83, which sets that gain and a pair of terminals 84 across which a further resistor may be connected to change the amplifier gain. Input diodes 85 provide voltage protection for the amplifier 82. The inverting input of the amplifier 82 is coupled by a resistor 86 to a source of ground reference potential 87 for the circuit apparatus 61. At the output 88 of the amplifier 82 is produced an amplified signal having a waveform similar to that shown at 89 in FIG. 3.

Between the output 87 of the first amplifier stage 82 and a second amplifier stage 90, is connected a diode clipper circuit 91 to limit the voltage of the signals delivered to the second amplifier stage 90 preventing saturation of the latter. A conventional passive band pass circuit or tank circuit 92 reduces noise coupled through to the second amplifier stage 90.

The second amplifier stage 90 includes an integrated circuit amplifier 93 which receives at its inverting input the signal from the tank circuit 92 via a high pass filter capacitor 94, which is intended to eliminate DC offsets. To control gain of the second amplifier stage 90 a feedback circuit 95 is provided, including an adjustable potentiometer 96 that may be set to adjust the gain to a desired level. The signal at the output 97 from the second amplifier stage 90 is an AC signal similar in form to the waveshape shown at 89 (FIG. 3A). An isolating resistor 98 and a high pass filter capacitor 99, which is intended to eliminate DC offsets, couple the output 97 to the input 100 of an analog multiplier integrated circuit 101. The analog multiplier 101 may be, for example, an Analog Devices integrated circuit model No. 534, the various pin terminal connections of which are illustrated in FIG. 3.

The analog multiplier 101 is used as the active element of a lock in amplifier. Such analog multiplier in cooperation with a low pass filter 102 coupled to its output effects synchronous demodulation of the received antenna signal A' with respect to the reference signal R, as will be described further below.

The reference signal R received on line 41R is coupled via an isolating resistor 113 and a capacitor high pass filter 115 for offset elimination to an input 116 of the analog multiplier 101. The phase shift of the reference signal R relative to the phase of the antenna signal A is such that the phase of the reference signal R is the same as the phase of the antenna signal A' as they are received at the inputs 100, 116 to the analog multiplier 101.

The analog multiplier 101 has an $X_2$ input terminal 120 which is coupled to the ground line 87. The $X_1$ input to the multiplier 101 is terminal 100, and the $Y_1$ terminal is input 116. Moreover, the $Y_2$ input terminal 121 and the $Z_2$ terminal are connected to ground. A gain resistor 122 determines the scale factor for the multiplier 101. Ordinarily the analog multiplier 101 will cause a zero voltage at terminal 125 when no antenna signal is received at input terminal 60.

Coupled to the output 125 of the analog multiplier 101 is an integrator 130 forming low pass filter 102 or other low pass filter device. The integrator 130 includes integrated circuit amplifier 131, integrating capacitor 132, feedback resistor 133, and input resistor 134. The input resistor 134 is connected to the inverting input of the amplifier 131 so that for a positive signal provided to such inverting input, there will be a negative signal produced at the output 135 of the amplifier. A diode 136 assures that any signal passing to the ladder network 69 will be a negative signal. A selectable switch 137, which is shown in the automatic mode, i.e. one that permits operation of the circuit portion 63 automatically to adjust the gain of the amplifier 68, may be thrown to a manual position whereby a fixed resistor 138 is connected in the feedback path for the amplifier 68 to eliminate the automatic gain feature of ladder network 69.

Operation of the demodulator circuit 62 will be described now. The analog multiplier 101 functions constantly to provide a signal P at its output 125 that is a function of the instantaneous magnitudes of the signals provided to the input terminals thereof. More specifically, the instantaneous magnitude of the signal P is defined according to the following equation $P = (X_1 - X_2) \times (Y_1 - Y_2) \div \text{scale factor}$.

The magnitudes of the values $X_1$, $X_2$, $Y_1$, and $Y_2$ are those at the respective inputs to the analog multiplier shown in FIG. 3. The reason for dividing the equation by the scale factor is to keep the product within a suitable range of magnitudes so as not to drive any portion of the demodulator circuit 62 into unwieldy saturation.

Summarizing the effect of the demodulator 62, when there is an antenna 10 present at the rip detector station 11, there will be produced at the $X_1$ and $Y_1$ terminals of the analog multiplier 101 respective AC signals that are of the same frequency and in phase with each other. The product of the various positive and negative peaks of such AC signals will be a series of positive pulses appearing at the output 125. Those positive pulses will be integrated by the integrator 130 and will appear as a substantially continuous negative pulse at the output 135 thereof being used as an output, then, to the circuit 63. The duration of such continuous negative pulse will be a function of the time required for the antenna 10 to pass the rip detector station 11.

On the other hand, when there is no antenna signal A' received at input terminal 60, although there may be a substantial amount of electrical noise received there or, in any event, provided at the input terminal 100 of the analog multiplier 101, the effect of the demodulator circuit 62 will be to filter out or eliminate such noise. Such electrical noise is usually random and, in particular, totally unrelated to the frequency and phase of the reference signal received at terminal 116. Therefore, the product of the electrical noise signal and the reference signal will be positive and negative voltages that ordinarily average out to a DC signal value, being a composite of positive and negative pulses that really will not have any substantial influence on the zero level output of the integrator 130.

In view of the foregoing, it will be clear that the demodulator circuit 62 effectively eliminates the influence of random electrical noise on the antenna signal A' so that such antenna signals can be accurately discerned and used to provide an input to the remaining portions 63, 64 of the circuit apparatus 61. Furthermore, by shifting the phase of the reference signal R with respect to the antenna signal A so that the phases of the reference signal and the received antenna signal A' are the same, the demodulator 62 can be used in a highly effective manner for a conveyor belt rip detector.

To facilitate setting up the circuit apparatus 61 and to test operability of the receiver Re, a test signal T is provided selectively via line 41T to the input of the demodulator circuit 62, specifically at the first amplifier stage 82 thereof. Such test signal is in phase with and at the same frequency as the reference signal R so that the multiplier 101 will be effective to produce as its output signal a plurality of only positive pulses representing the product of the signals R and T. The test signal T should not be produced at the same time an antenna signal A' may be received at the input terminal 60 when the monitor system 1 is checking for rips, and for that purpose the signal output and switching circuit 140 of FIG. 4 effects appropriate control.

Turning now to FIG. 4, the signal output and switching circuit 140 is shown in detail. The oscillator 30 provides to the phase shift circuit 40 a constant frequency AC signal. The phase shift circuit 40 includes means responsive to shift control signals provided on line or lines 141 by the computer 26 and delivers on line 142 an AC signal that is of one phase or another shifted from the first.

The AC signal on line 142 is provided to a buffer amplifier stage 143, a filter 44 and a power amplifier stage 148. In response to the AC signal delivered to line 142, there will be an AC signal produced at the output 151 of the amplifier 148 to produce the antenna signal A at the capacitive probe or transmitter plate 12 for coupling to respective antennas carried passed the rip detector station 11. Dash line 151a represents the possibility that the buffer B could be connected to the circuits 153, 172 instead of line 151.

A conventional power supply 152 provides DC power, as is indicated, to the various portions of the signal to switching circuit 140 (FIG. 4) and to the various portions of the signal control circuit apparatus 61 (FIG. 3).

A filter/rectifier circuit 153 in connection with the output 151 from the amplifier 148 provides at the terminal 154 a DC signal that represents proper operation of the oscillator 30, phase shift circuit 40 and signal output and switching circuit 140 to derive an AC antenna signal A for coupling at transmitter plate 12 to an antenna 10. Accordingly, the circuit 153 includes a pair of filter capacitors 155, 156, resistors 157, 158, rectifier (diode) 159, output transistor 160, output resistors 161, 162, and zener diode 163. An input potentiometer 164 coupled between the output 151 of amplifier 148 and ground 87 also is at the input of the circuit 153. The circuit 153 provides at the terminal 154 a positive DC signal as long as there is an AC signal produced at terminal 151. If the signal at 151 is a DC signal, the capacitor 155 will block the same to prevent the production of a positive DC signal at terminal 154; also, there will be no signal produced at terminal 154 if there is no signal produced at terminal 151. In operation of the rip detector system 2 as controlled by the computer 26, whenever an antenna 10 is not detected in the conveyor belt 3 where it is expected to be detected, ordinarily before signalling a rip and causing shut down of the conveyor belt system 2, the computer 26 will check the signal level at terminal 154 to confirm whether or not the oscillator 30, etc., are functional to deliver the desired antenna signal A to the transmitter plate 12.

A logic control circuit 170 is coupled by line 171 to the computer 26. The logic control circuit 170 responds to logic 1 or logic 0 signals on line 171 to control the signals on line 141 and, thus, whether or not the signal produced by the oscillator 30 is to be shifted in phase or not by the phase shift circuit 40, and to control a series of analog switches 172 that determine whether or not the test signal T will be produced on line 41T. More specifically, a logic 1 signal received on line 171 causes saturation of control transistor 173, which, in turn, causes the inverting amplifiers 174, 175 to produce at their outputs logic 1 and logic 0 signals, respectively. The logic 1 signal on line 141a causes the phase shift circuit 40 to shift the phase of the signal produced by the oscillator 30 so that the phase of the signal produced on line 142 and, thus, the phase of the antenna signal A delivered to the transmitter probe 12 will be shifted in phase from the reference signal R. Moreover, the logic 0 signal at the output of inverting amplifier 175 makes analog switches 172a, 172b nonconductive so as to block any test signal T from reaching the line 41T. Furthermore, the logic 1 signal at the output of inverting amplifier 174 makes analog switches 172c, 172d conductive, thereby to assure that any signal that may pass either or both of the analog switches 172a, 172b will be conducted through to ground 87.

On the other hand, a logic 0 signal at line 171 from the computer 26 terminates conduction in the control transistor 173, whereupon the inverting amplifier 174 produces a logic 0 on line 141a, and the amplifier 175 produces a logic 1. Such logic 1 signal on line 141a causes the phase shift circuit 40 no longer to shift the phase of the AC signal from the oscillator 30. As a result, the phase of the signal at output line 151 from amplifier 148 now will be the same as the phase as the reference signal produced by the oscillator 30 at line 41R. The signal from line 151 is coupled by the potentiometer 164 to the analog switch circuit 172. The logic 1 signal on line 141b causes the analog switches 172a, 172b to be conductive thereby passing the test signal to line 41T for the test purposes described above with reference to FIG. 3. At the same time, the logic 0 signal on line 141a causes the analog switches 172c, 172d to be nonconductive so as to interfere with delivery of the test signal to the line 41T.

It is noted that during conduction in the analog switches 172a, 172b, the signal passed through them is derived from the output 151 of the amplifier 148. The potentiometer 164 may be adjusted so the amplitude of the test signal and the received antennae signals will be approximately the same. If there were an adequate transmitter antenna signal at the transmitter probe 12 when a test signal is being delivered to line 41T, when there is no antenna present at the rip detector station, such signal will not be coupled through to the receiver plate 13 or input terminal 60 (FIG. 3), and when there is an antenna so present, the received antenna signal A' would not detrimentally affect the test procedures.

A manual test switch 180 may be provided in the signal output and switching circuit 140 for the purpose of effecting a manual control of the test signal production. The switch 180 is shown as a normally open switch connected across the emitter and collector of the control transistor 173. Therefore, if a logic 0 signal were delivered to line 171 causing a logic 1 ordinarily to be produced at the collector of that control transistor and, more particularly, at the input of the inverting amplifier 174, closure of the test switch 180 would eliminate that logic 1 signal to prevent delivery of a test signal T to the line 41T. Alternatively, the switch 180 could be a normally closed switch connected in series with the emitter of the control transistor 173 and ground 87. Therefore, if a logic 1 signal were delivered to the line 171 trying to cause conduction in the control transistor 173, and, thus, a logic 0 at the input to the inverting amplifier 174; opening of such manual test switch could open the conduction path for the transistor 173 thus causing a logic 1 signal to be delivered to the input of the inverting amplifier 174. Of course other combinations of manual test switch also may be used, as desired.

Figure 5:
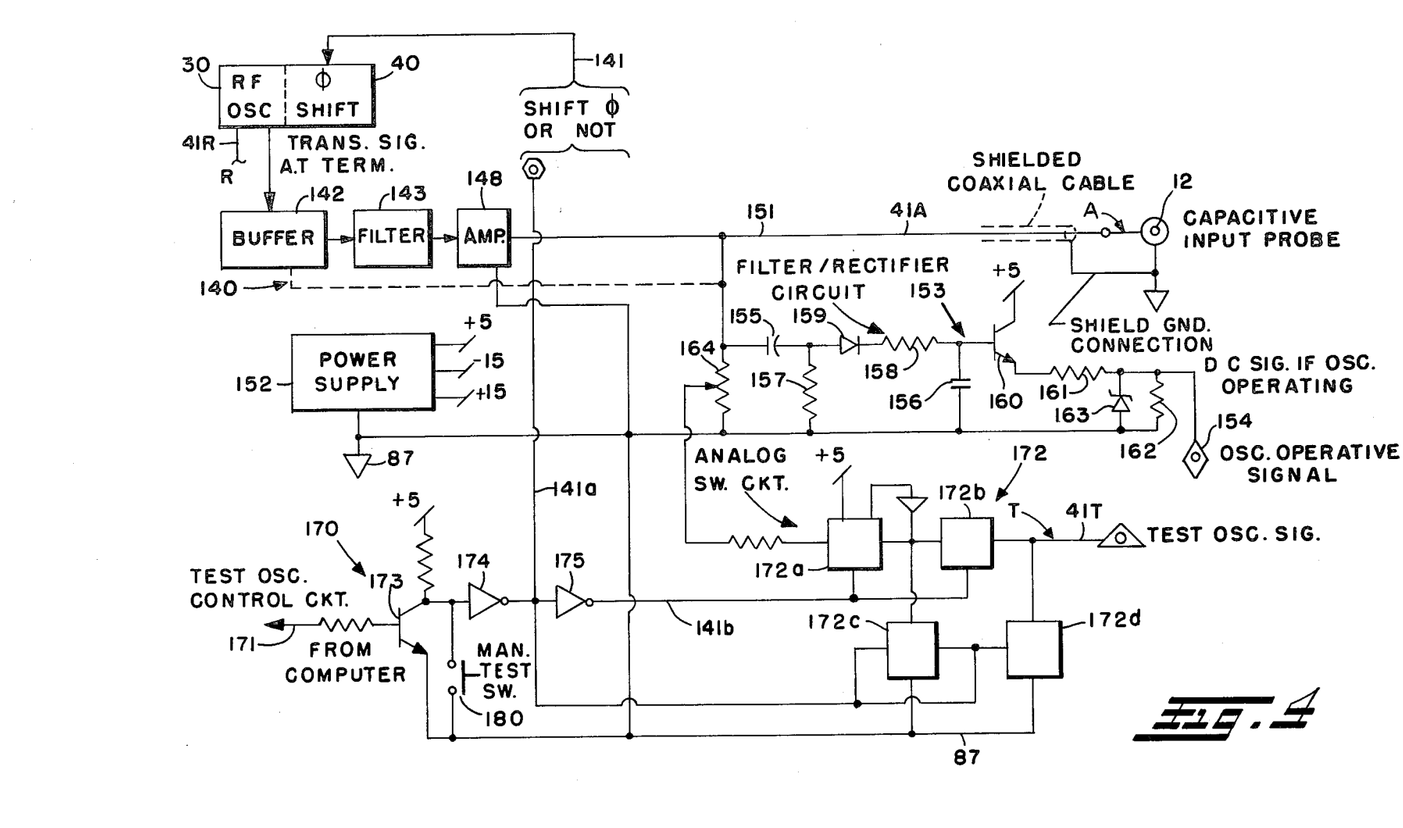
FIG. 5 illustrates a representative flow chart of procedures and steps followed in operation of the overall monitor system.

The several operating modes for the monitor system 1 are depicted in a functional block diagram in FIG. 5. The monitor system 1 may be used as a counting aid for antennas or other events detected by the monitor system, block 200. A user puts a reference mark on the belt 3; enters by user command portion 25 a rezero command for an internal counter in the computer 26 to cause the display 27 to show a zero count value, as represented at 201; and enters an input command to the monitor system 1 to start the conveyor belt system 2, e.g. by closing relay 23. As each whole antenna passes and is counted at the rip detector station 11, the event detect signal on line 34 causes the computer 26 to increment the value shown on the display 27. When the reference mark returns to the rip detector station, the value shown on the display 27 will indicate the number of whole antennas in the belt 3 detectible by the event detector 20. With the number of antennas or other events known, the user may enter that information to the computer 26, box 202, for example by a conventional keyboard, as represented at 203, of the user command portion 25. The user would then enter a command to the computer 26 via the keyboard or other switch, for example, to cause the monitor system to commence operation in the programming mode to build the table of information on the distances between adjacent pairs of antennas. The use of the monitor system 1 as an event counting aid and the just described keyboard entry of events to the monitor system are, however, alternate embodiments to the best mode of the present invention.

In box 204 the automatic programming mode of the antenna locations and the building of the internal table during one belt cycle is presented. According to the best mode of the invention, a user may put a reference mark on the coveyor belt 3 at the rip detect station 11 and enter a start programming command, represented at 205, to start the conveyor belt system to build up the table of relative distance information. When the reference mark returns to the rip detector station 11, the user may enter a start rip detect command signal, represented at 206, for example by a further switch that delivers an appropriate signal to the computer 26, to cause the monitor system 1 automatically to observe the condition of the belt 3 to sense a rip therein. Such rip detect mode of operation is represented at box 207.

As an alternate embodiment to the best mode of the present invention, the computer 26 may be programmed to cause the monitor system 1 automatically to enter the rip detect mode. In this alternate embodiment, the number of antennas would have to be entered, box 202, as aforesaid. The monitor system, then, would automatically build the table of information for that number of antennas; upon completion of the table, the monitor system 1 automatically would enter the rip detect mode, box 207.

During operation of the monitor system 1 in the rip detect mode, according to the information contained in the table, the monitor system 1 will look for each successive antenna at its anticipated position relative to the progress of the belt 3. In order to take into consideration the possibility of slippage, stretching, and the like of the conveyor belt during its operation and life expectancy, as well as other similar inaccuracies in the actual position of the respective antennas, a window of error is permitted preferably on both sides of the anticipated position of each antenna. Therefore, the monitor system 1 will look for an antenna slightly before its expected arrival at the rip detector station 11 and for a brief period after the expected arrival; if no antenna or prescribed number of antennas is detected within the permitted window, the monitor system 1 promptly stops the conveyor belt system 2, as shown at box 208. However, when the monitor system 1 does detect an antenna within an expected window, the actual position of that antenna, as detected by the progress detector 21, relative to the position of the preceding antenna, is input at the appropriate location in the table to update the same, thereby allowing the tabular information to vary gradually within prescribed limits.

Whenever the monitor system 1 shuts down the conveyor belt system 2 due to a missed antenna, the user may restart the conveyor belt system, usually after having visually inspected the belt. As is shown at 209, such restart may be without deleting the information concerning the missed antenna from the table to check, for example, whether the shut-down was due only to an inadvertently broken antenna. If the missed antenna were broken, even though the belt is otherwise intact, the monitor system 1 would shut down the conveyor belt system 2 at the completion of the next cycle. Usually the control for this type of restart operation would be accessible to a user in the field. However, if the monitor system 1 and conveyor belt system 2 were to be restarted with deletion from the table of the information concerning the broken antenna, say, as indicated at 210, then the system would continue operating in rip detect mode without looking for the suspect antenna during the subsequent cycles of operation of the conveyor belt. This latter type of restart operation ordinarily would be accessible only to a qualified serviceman, who would be expected to check the belt 3 and system 1 thoroughly before deleting the information concerning the suspect antenna from the table.

As is shown at 211 in FIG. 5, the diagnostics portion of the monitor system 1 continuously checks various portions of the system to assure proper operation thereof. In the event of a failure being detected by the diagnostics portion, the monitor system 1 will promptly stop the belt and will energize the mode and diagnostic lights indicators portion 24 appropriately to display the reason for shut-down, box 212. Moreover, the monitor system may be overridden manually by the user, box 213, to continue operation of the conveyor belt system 2 without rip detection by the monitor system 1. Ordinarily, such overriding would occur when it is believed that a failure has occurred in the monitor system 1 while the conveyor belt 3 remains intact.

In accordance with the invention there are several ways in which the test signal T may be used. For example, the test signal may be used to assure that various portions of the circuit apparatus 61 are properly adjusted, as was mentioned above. Additionally, in block 207 and/or block 208 when an antenna is not found where expected, before stopping the belt the computer 26 may cause a test signal to be delivered to line 41T. Proper receipt of such test signal so as to cause production of a desired digital signal on the output bus 65 (FIG. 3) will indicate both that the oscillator 30 is operating correctly and that the circuit apparatus 61 and circuit 140 are operating properly. The computer 26 would then cause shut down of the belt. On the other hand, if the production of such test signal would not result in a correct digital signal at bus 65, the computer could interpret the same as a failure in the electronics of the monitor system 1 and may function, then, to permit continued operation of the belt 3, although providing an indication to an operator that there is a fault in the rip detector system. Furthermore, production of a DC signal at terminal 154 indicating that the oscillator 30 is operative, either when a test signal is being delivered to line 41T or when an antenna is present at the rip detector station 11, but there is no proper digital signal produced on the bus 65 would indicate that the oscillator is operating but that there is a fault in the circuit apparatus 61 or else in the detector amplifier 32. The sensing of any one of the noted faults also could effect the control of the diagnostics found at locations 211 and 212 in FIG. 5 indicating a failure in the rip detector apparatus and a stopping, of the belt.

STATEMENT OF INDUSTRIAL APPLICATION

In view of the foregoing, it will be appreciated that the invention may be employed for signal demodulation and detection purposes as well as for facilitating diagnosis of faults, especially these being in connection with conveyor belt rip detector apparatus and methods.

I claim:

1. In a conveyor belt rip detector system in which antennas representative of belt integrity are sequentially carried past a rip detector station, including transmitter means for transmitting an AC transmitter signal and receiver means for receiving such AC transmitter signal coupled thereto by respective antennas, the improvement comprising:

lock in amplifier means for improving the signal to noise ratio of the AC transmitter signal coupled by such antennas to said receiver means.

2. The improvement of claim 1, said lock in amplifier means comprising an analog multiplier.

3. The improvement of claim 2, further comprising low pass filter means coupled to the output of said analog multiplier for filtering the output thereof.

4. The improvement of claim 3, said low pass filter means comprising integrator means for integrating the output signal from said analog multiplier.

5. The improvement of claim 4, further comprising phase shift circuit means cooperative with said transmitter means for producing therewith two AC signals of at least substantially the same frequency but of different relative phases.

6. The improvement of claim 5, wherein such AC transmitter signal is one of such two AC signals and the same undergoes a phase shift when coupled via an antenna to such receiver means, and further comprising tuning means for tuning the phase relation of such two AC signals such that the phase of the second AC signal and the phase of such AC transmitter signal as received by such receiver means are at least substantially the same.

7. The improvement of claims 1 or 6, further comprising means for adjusting offsets in said lock in amplifier means.

8. The improvement of claim 6, further comprising high pass filter means for blocking from said lock in amplifier means relatively low frequency signal components from such two AC signals.

9. The improvement of claim 1, said transmitter means comprising means for producing at least three AC signals, including such AC transmitter signal, a reference signal, and a test signal, such signals having at least substantially the same frequency, the phases of such reference and test signals being at least substantially the same, and the phases of such AC transmitter signal and reference signal being different, and further comprising switch means for selectively delivering such test signal to such receiver means.

10. The improvement of claim 9, said switch means comprising analog switch means for passing or blocking such test signal.

11. The improvement of claim 9, wherein such AC transmitter signal undergoes a phase shift when coupled via an antenna to such receiver means, and further comprising tuning means for tuning the phase relation of at least two of such AC signals such that the phase of such reference signal and such AC transmitter signal, as received by such receiver means, are at least substantially the same.

12. A conveyor belt rip detector apparatus for sensing antennas carried by a conveyor belt as a representation of belt integrity, comprising:

transmitter means for transmitting a transmitter signal, and receiver means for receiving such transmitter signal coupled thereto by respective antennas, said receiver means including lock in amplifier means for filtering the transmitter signal coupled by such antennas to said receiver means.

13. The apparatus of claim 12, said lock in amplifier means comprising an analog multiplier.

14. The apparatus of claim 12, further comprising phase shift meand cooperative with said transmitter means for producing therewith two AC signals of at least substantially the same frequency but of different relative phases.

15. Apparatus for monitoring the integrity of a conveyor belt carrying antennas representative of belt integrity, comprising:

signal generating means for generating a transmitter signal for transmission to such antennas and a reference signal, such signals having a selected phase relationship, receiver means for receiving such transmitter signals coupled thereto by such antennas, whereby such antennas effect modulation of such transmitter signal in periodically coupling the same to said receiver means, and said receiver means including demodulating means for demodulating such modulated transmitter signals with respect to such reference signal, as such modulated transmitter signals are received via respective antennas.

16. The apparatus of claim 15, wherein said demodulation means comprises analog multiplier means for obtaining a product of the transmitter signal received from such antennas and such reference signal.

17. The apparatus of claims 16 or 13, further comprising low pass filter means coupled to the output of said analog multiplier.

18. The apparatus of claim 17, said low pass filter means comprising integrator means for integrating the output signal from said analog multiplier.

19. The apparatus of claim 16, said analog multiplier means comprising a lock in amplifier means for filtering the transmitter signal coupled by such antennas to said receiver means.

20. The apparatus of claims 12 or 19, further comprising means for adjusting offsets in said lock in amplifier means.

21. The apparatus of claims 12 or 19, further comprising high pass filter means for blocking from said lock in amplifier means relatively low frequency signal components from such two AC signals.

22. The apparatus of claim 15, wherein such transmitter and reference signals are AC signals, and further comprising phase shift means for shifting the phase of one of such transmitter and reference signals relative to the phase of the other.

23. The apparatus of claims 14 or 22, wherein such AC transmitter signal undergoes a phase shift when coupled via an antenna to such receiver means, and further comprising tuning means for tuning the phase relation of such two AC signals such that the phase of the second AC signal and the phase of such AC transmitter signal as received by such receiver means are at least substantially the same.

24. The apparatus of claims 12 or 15, said transmitter means comprising means for producing at least three AC signals, including a transmitter signal, a reference signal, and a test signal, such signals being AC signals having at least substantially the same frequency, the phases of such reference and test signals being at least substantially the same, and the phases of such AC transmitter signal and reference signal being different, and further comprising switching means for selectively delivering such test signal to such receiver means.

25. The apparatus of claim 24, said switching means comprising analog switch means for passing or blocking such test signal.

26. The apparatus of claim 25, further comprising computer control means for selectively controlling operation of said analog switch means.

27. The apparatus of claims 12 or 15, further comprising computer control means for monitoring the progress of such conveyor belt and receipt of such transmitter signal by said receiver means, and stop means controlled by said computer control means for stopping such conveyor belt when a prescribed number of antennas has not been received by said receiver means where expected by said computer control means.

28. The apparatus of claims 12 or 15, further comprising phase shift means coupled to said transmitter means for shifting the phase of such transmitter signal thereby to produce a test signal that is shifted in phase relative to the phase of such transmitter signal.

29. The apparatus of claim 28, further comprising control means for controlling said phase shift means to produce such test signal.

30. The apparatus of claim 29, said control means comprising means for sensing the apparant occurence of a rip in such conveyor belt and upon such sensing causing said phase shift means to produce such test signal, and further comprising means for using such test signal to check the operativeness of said receiver means.

31. The apparatus of claim 28, further comprising means for selecting the phase relationship of such transmitter and test signals.

32. The apparatus of claim 28, further comprising means for selecting the phase relationship of such transmitter and reference signals.

33. The apparatus of claim 15, said transmitter means including means for producing a reference signal, and said demodulating means comprising a lock in amplifier means for filtering the transmitter signal coupled by such antennas to said receiver means.

34. The apparatus of claims 12 or 33, further comprising phase shift means coupled to said transmitter means for shifting the phase of such transmitter signal thereby to produce a test signal that is shifted in phase relative to the phase of such transmitter signal, and wherein such reference, transmitter, and test signals are AC signals, and the phase of such reference signal is at least the same as that of such test signal; and further comprising means for ordinarily coupling such transmitter signal, as received at said receiver means via respective antennas, and such reference signal to said lock in amplifier means and, when said phase shift means is operative, to cause production of such test signal, for coupling such test signal and reference signal to said lock in amplifier means.

35. The apparatus of claim 34, further comprising means for producing substantially continuously a substantially DC signal representative of operativeness of said transmitter means to produce such transmitter signal.

36. In a method for improving the signal recognition ratio in a conveyor belt rip detector in which antennas representative of integrity of and carried by the conveyor belt sequentially past a rip detector station couple a transmitter signal between a transmitter and a receiver and, therefore, modulate such transmitter signal, the improvement comprising:

demodulating such transmitter signal using a reference signal having substantially the same frequency as such transmitter signal.

37. The improvement of claim 36, said demodulating comprising delivering such reference signal and the transmitter signal received by such receiver via antennas to an analog multiplier.

38. The improvement of claim 37, said demodulating further comprising low pass filtering the output of such lock in amplifier.

39. The improvement of claim 36, said demodulating comprising delivering such reference signal and the transmitter signal received by such receiver via antennas to a lock in amplifier means.

40. The improvement of claim 39, said demodulating further comprising low pass filtering the output of such lock in amplifier.

41. The improvement of claims 38 or 40, further comprising producing such transmitter and reference signals as respective AC signals, wherein such transmitter signal undergoes a phase shift upon being coupled from such transmitter to such receiver, and tuning the relative phases of such produced transmitter and reference signals to optimize said demodulating.

42. The improvement of claim 41, further comprising using such demodulated transmitter signal as a representation of the integrity of such conveyor belt.

43. The improvement of claims 36, 37, or 39, further comprising producing such transmitter and reference signals as respective AC signals, wherein such transmitter signal undergoes a phase shift upon being coupled from such transmitter to such receiver, and shifting the relative phases of such produced transmitter and reference signals to cause the phases thereof as such signals are received at such receiver to be at least substantially the same.

44. The improvement of claim 43, further comprising using such demodulated transmitter signal as a representation of the integrity of such conveyor belt.

45. A method of monitoring the integrity of a conveyor belt carrying antennas representative of conveyor belt integrity, comprising:
producing an AC transmitter signal, producing an AC reference signal, modulating such AC transmitter signal by sequentially coupling and not coupling such AC transmitter signal with respect to a receiver as such antennas are carried sequentially past a rip detector station, coupling such AC reference signal to such receiver, demodulating such AC transmitter signal coupled to such receiver by such reference signal, and tuning the phase relation between such AC transmitter signal and such AC reference signal to optimize said demodulating.

46. The method of claim 45, said demodulating comprising delivering such reference signal and the transmitter signal received by such receiver via antennas to an analog multiplier.

47. The method of claim 46, said demodulating comprising delivering such reference signal and the transmitter signal received by such receiver via antennas to a lock in amplifier.

48. The method of claim 46, said demodulating further comprising low pass filtering the output from such lock in amplifier.

49. The method of claim 45, wherein such transmitter signal undergoes a phase shift upon being coupled from such transmitter to such receiver, and said tuning comprises shifting the relative phases of such produced transmitter and reference signals to cause the phases thereof as such signals are received at such receiver to be at least substantially the same.

50. The method of claims 45 or 49, further comprising using such demodulated transmitter signal as a representation of the integrity of such conveyor belt.

51. The method of claim 45, further comprising producing an AC test signal, and wherein said producing steps comprise producing such signals such that the frequencies of such transmitter, reference and test signals are at least substantially the same, the phases of such transmitter and reference signals are different, and the phases of such reference and test signals are at least substantially the same.

52. The method of claim 45, wherein said tuning comprises shifting the relative phase of at least one of such transmitter and reference signals relative to the other to cause the phases thereof to be the same upon receipt of such signals at such receiver.

53. The method of claim 52, further comprising supplying such reference signal to such receiver, ordinarily supplying such transmitter signal to such receiver via such antennas, and selectively controlling said tuning to prevent said shifting to cause production of such AC transmitter signal as an AC test signal that is in phase with such reference signal, and when such selectively controlling is occuring supplying such test signal at least substantially directly to such receiver.

54. The method of claim 53, said supplying such test signal comprising supplying the same at least substantially independently of such antennas.

55. The method of claim 53, further comprising detecting whether transmitter signals are received by such receiver as a function of the travel of such conveyor belt past such rip detector station as an indication of belt integrity, and sensing the apparent occurrence of a rip in such belt when a prescribed number of antennas should have passed such rip detector station and have not coupled such transmitter signal to such receiver.

56. The method of claim 55, further comprising upon sensing an apparent rip in such belt, effecting such selectively controlling, and checking operation of such receiver as a function of such test and reference signals.

57. The method of claim 56, further comprising producing substantially continuously an indicating signal representative of operability of such transmitter to produce such transmitter signal, and said checking further comprising checking such operability by sensing such indicating signal.

58. The method of claims 55, 56, or 57, further comprising stopping movement of such belt upon detecting such apparent rip and indicating the reason for such stopping, including whether such reason is due to inoperability of such transmitter to produce such transmitter signal or inoperability of such receiver.

* * * * *

UNITED STATES PATENT AND TRADEMARK OFFICE
CERTIFICATE OF CORRECTION

PATENT NO. : 4,470,120
DATED : September 4, 1984
INVENTOR(S) : Lyle Martin Haylett It is certified that error appears in the above—identified patent and that said Letters Patent is hereby corrected as shown below:

In column 11, line 55, "44" should read --144--.

In column 11, line 62, the words "buffer B" should be changed to --buffer 143--.

In the drawings, Sheet 3, Fig. 4:

In the lower left-hand portion of the sheet, reference numeral --142-- should be added to the line between the RF oscillator (RF OSC) and the buffer amplifier (BUFFER);

Original reference numeral "142" identifying the buffer amplifier (BUFFER) should be changed to --143--;

Original reference number "143" designating the filter should be changed to --144--; and In the lower left-hand portion of the Sheet 1 the dashed line between the buffer amplifier (BUFFER) and the line just above resistor 164 should have reference numeral --151a-- added.

Signed and Sealed this

Twenty-first Day of October, 1986

[SEAL]

Attest:

DONALD J. QUIGG

Attesting Officer

Commissioner of Patents and Trademarks